(12) United States Patent
Fujita (10) Patent No.: US 11,049,366 B2
(45) Date of Patent: Jun. 29, 2021

(54) GAME MACHINE WITH SORTED OUTCOMES

(71) Applicant: SEGA SAMMY CREATION INC., Yokohama (JP)

(72) Inventor: Shunichi Fujita, Tokyo (JP)

(73) Assignee: SEGA SAMMY CREATION INC., Yokohama (JP)

(*) Notice: Subject to any disclaimer, the term of this patent is extended or adjusted under 35 U.S.C. 154(b) by 78 days.

(21) Appl. No.: 16/060,585

(22) PCT Filed: Dec. 10, 2015

(86) PCT No.: PCT/JP2015/084723
§ 371 (c)(1),
(2) Date: Jun. 8, 2018

(87) PCT Pub. No.: WO2017/098647
PCT Pub. Date: Jun. 15, 2017

(65) Prior Publication Data
US 2019/0228611 A1 Jul. 25, 2019

(51) Int. Cl.
G07F 17/32 (2006.01)
A63F 5/04 (2006.01)
A63F 13/80 (2014.01)

(52) U.S. Cl.
CPC ............ *G07F 17/3267* (2013.01); *A63F 5/04* (2013.01); *A63F 13/80* (2014.09); *G07F 17/3244* (2013.01)

(58) Field of Classification Search
None
See application file for complete search history.

(56) References Cited

U.S. PATENT DOCUMENTS

| 2005/0064926 A1* | 3/2005 | Walker ............... G07F 17/32 463/16 |
| 2007/0077981 A1* | 4/2007 | Hungate ........... G07F 17/3227 463/16 |
| 2007/0167216 A1* | 7/2007 | Walker ................. A63F 9/00 463/18 |
| 2007/0238514 A1 | 10/2007 | Sato |
| 2012/0115577 A1* | 5/2012 | Kaneko ............. G07F 17/3244 463/20 |
| 2015/0031436 A1 | 1/2015 | Suda |
| 2017/0092071 A1* | 3/2017 | Cuddy ................. G06F 3/02 |

FOREIGN PATENT DOCUMENTS

| JP | 2007-275296 A | 10/2007 |
| JP | 2013-230261 A | 11/2013 |
| JP | 2015-024139 A | 2/2015 |

OTHER PUBLICATIONS

PCT Search Report issued in related application PCT/JP2015/084723, dated Mar. 1, 2016, with English language translation, 3 pages.
International Preliminary Report on Patentability issued in related application PCT/JP2015/084723, dated Jun. 21, 2018, with English language translation, 12 pages.

* cited by examiner

*Primary Examiner* — Lawrence S Galka
(74) *Attorney, Agent, or Firm* — Faegre Drinker Biddle & Reath LLP

(57) ABSTRACT

Provided is a technique for obtaining a more enjoyable game. A game device comprises a determination unit for determining results of a plurality of games randomly, a sorting unit for sorting, on the basis of the results, a sequence in which the plurality of games are to be started, and a starting unit for starting the games in the sorted sequence.

5 Claims, 7 Drawing Sheets

CONVENTIONAL TECHNIQUE

PRE-SORTING

| GAME ID | RANDOM DATA | GAME RESULT | SCORE |
|---|---|---|---|
| 0001 | AA,AA,AA,AA,AA | 3 J's | 50 |
| 0002 | BB,BB,BB,BB,BB | | 0 |
| 0003 | CC,CC,CC,CC,CC | | 0 |
| 0004 | DD,DD,DD,DD,DD | 5 Wild's | 300 |
| 0005 | EE,EE,EE,EE,EE,EE | | 0 |
| 0006 | FF,FF,FF,FF,FF,FF | RETRIGGER | 500 |
| 0007 | GG,GG,GG,GG,GG | 5 J's | 100 |
| 0008 | HH,HH,HH,HH,HH | | 0 |
| 0009 | II,II,II,II,II | | 0 |
| 0010 | JJ,JJ,JJ,JJ,JJ | 5 A's | 200 |

POST-SORTING

| GAME ID | RANDOM DATA | GAME RESULT | SCORE |
|---|---|---|---|
| 0002 | BB,BB,BB,BB,BB | | 0 |
| 0003 | CC,CC,CC,CC,CC | | 0 |
| 0005 | EE,EE,EE,EE,EE,EE | | 0 |
| 0008 | HH,HH,HH,HH,HH | | 0 |
| 0009 | II,II,II,II,II | | 0 |
| 0001 | AA,AA,AA,AA,AA | 3 J's | 50 |
| 0007 | GG,GG,GG,GG,GG | 5 J's | 100 |
| 0010 | JJ,JJ,JJ,JJ,JJ | 5 A's | 200 |
| 0004 | DD,DD,DD,DD,DD | 5 Wild's | 300 |
| 0006 | FF,FF,FF,FF,FF,FF | RETRIGGER | 500 |

FIG.8

GAME MACHINE WITH SORTED OUTCOMES

CROSS-REFERENCE TO RELATED APPLICATIONS

This application is the U.S. national phase of the International Patent Application No. PCT/JP2015/084723 filed Dec. 10, 2015, the entire content of which is incorporated herein by reference.

TECHNICAL FIELD

The present disclosure relates to a game device, a program, and an arcade game device.

BACKGROUND

In recent years, various game devices on which games can be played via a computer have been developed. For example, Japanese Patent Publication JP 2015-024139 A discloses a game device that allows a slot game to be played by displaying parts of virtual reels on a display unit and spinning the reels under the control of a computer. In this type of slot game, the game device spins the reels in response to an operation performed by a player, stops the reels in sequence, and displays a combination of symbols on the reels on the display unit. The game device then grants the player an award on the basis of the displayed combination of symbols. For example, when five identical symbols are arranged consecutively, a higher award is granted to the player than when three identical symbols are arranged consecutively. Further, depending on the symbols displayed on the stopped reels, an award may not be granted.

The player then starts the next game by spinning the reels, whereupon an award is granted in accordance with the combination of symbols displayed on the stopped reels. The award may be better or worse than the award granted in the previous game.

SUMMARY

The type of award granted is of primary concern to the player, and greatly affects enjoyment of the game.

The present disclosure has been designed in consideration of the circumstances described above, and an object thereof is to provide a technique for obtaining a more enjoyable game.

A game device according to the present disclosure comprises a determination unit for determining results of a plurality of games randomly, a sorting unit for sorting, on the basis of the results, a sequence in which the plurality of games are to be started, and a starting unit for starting the games in the sorted sequence.

A game method according to the present disclosure is implemented in a game device having a control unit, and comprises causing the control unit to determine results of a plurality of games randomly, causing the control unit to sort, on the basis of the results, a sequence in which the plurality of games are to be started, and causing the control unit to start the games in the sorted sequence.

A program according to the present disclosure causes a computer to function as a game device comprising a determination unit for determining results of a plurality of games randomly, a sorting unit for sorting, on the basis of the results, a sequence in which the plurality of games are to be started, and a starting unit for starting the games in the sorted sequence.

According to the present disclosure, a technique for obtaining a more enjoyable game can be provided.

BRIEF DESCRIPTION OF THE DRAWINGS

Various embodiments of the disclosure are illustrated in the drawings, in which.

DETAILED DESCRIPTION

An embodiment of the present disclosure will be described below with reference to the figures. Note, however, that the embodiment described below is merely an example, and does not exclude the application of various amendments and techniques not described explicitly below. In other words, the present disclosure may be implemented after undergoing various amendments (combinations of embodiments and so on) within a scope that does not depart from the spirit thereof. Further, in the following description of the figures, identical or similar parts have been allocated identical or similar reference numerals. The figures are schematic, and do not necessarily reflect actual dimensions, ratios, and so on. Dimensional relationships and ratios may also differ among the figures.

Figure 1:
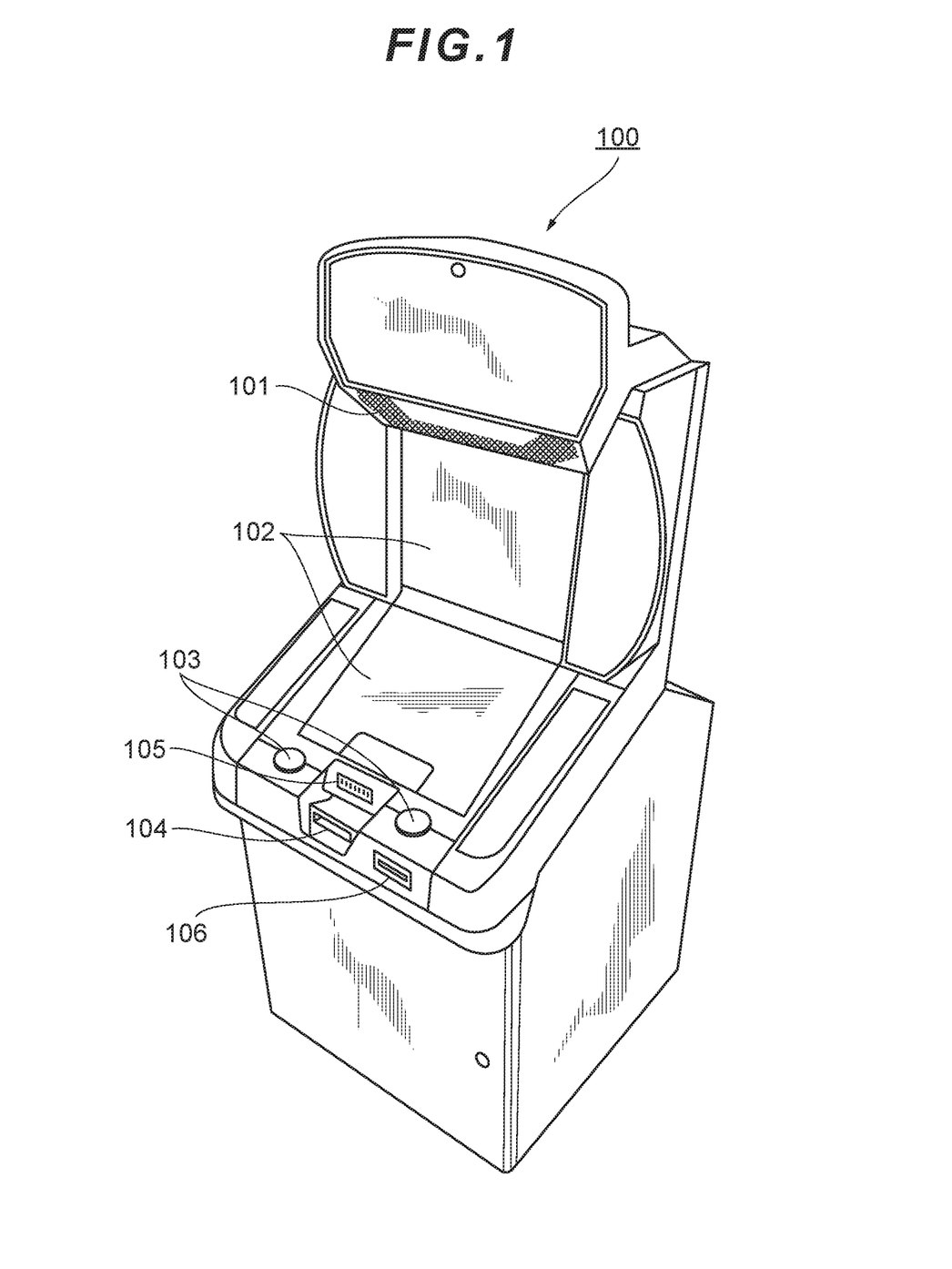
FIG. 1 is a front perspective view showing an outer appearance of a game device according to an embodiment.

A game device and a program according to an embodiment of the present disclosure will be described below using the figures. FIG. 1 is a front perspective view showing an outer appearance of the game device according to this embodiment.

A game device 100 shown in FIG. 1 is a game device disposed in a casino, an amusement facility, or the like. In this embodiment, a player can play a slot game using the game device 100.

Example of Hardware Configuration of Game Device

First, an example of a configuration of the game device 100 will be described.

The game device 100 comprises a speaker 101, a plurality of display devices 102, a plurality of operating buttons (referred to hereafter as an "operation input device" 103), a card reading device 104, a banknote insertion device 105, and a ticket payout device 106. The banknote insertion device 105 is a device for reading an inserted banknote or ticket. The speaker 101 outputs voice guidance, sound effects, and so on in relation to the game. The display device 102 is constituted by an upper-lower pair of display devices, and displays images (static images, moving images, video, and so on, for example) representing or dramatizing the game. The operation input device 103 is constituted by a plurality of buttons, and the buttons are used to input instructions from the player into the game device. Note that the operation input device 103 is not limited to this configuration, and may be configured as desired as long as the player can input instructions thereon. The card reading device 104 reads information from a card owned by the player. The ticket payout device 106 pays out cards to the player.

The card read by the card reading device 104 is a medium storing game information relating to the player. For example, points or the like that are procured in accordance with the game state of the player can be added to and stored on the card. The player can obtain various services in accordance with the information stored on the card, although the stored content of the card does not affect the game result.

Figure 2:
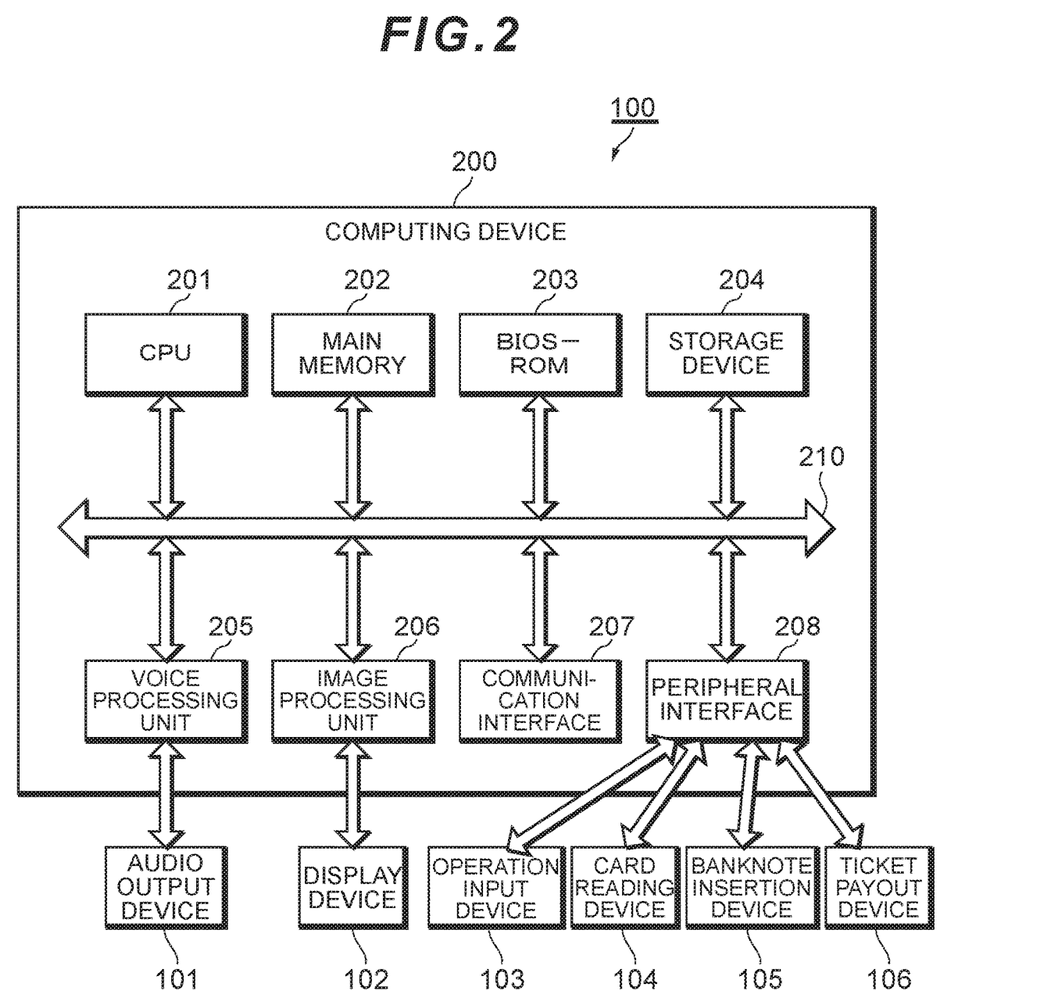
FIG. 2 is a block diagram showing a main hardware configuration of the game device according to this embodiment.

Referring to FIG. 2, a hardware configuration of the game device 100 will be described. As shown in FIG. 2, the game device 100 comprises, for example, a computing device 200, an audio output device 101, the display device 102, the operation input device 103, the card reading device 104, the banknote insertion device 105, and the ticket payout device 106.

The computing device 200 implements overall control of the game device 100. The computing device 200 is a computer circuit element constituted by various processors, memories, and so on, and comprising a chipset, for example. The computing device 200 according to this embodiment comprises, for example, a CPU 201, a main memory 202, a BIOS-ROM 203, a storage device 204, a voice processing unit 205, an image processing unit 206, a communication interface 207, a peripheral interface 208, and a system bus 210 for connecting these components.

The CPU 201 causes the computing device 200 to realize various functions by executing a game program expanded on the main memory 202, for example. In other words, the computing device 200 realizes the game in cooperation with other hardware by executing the game program under the control of the CPU 201.

The storage device 204 stores programs and various data. The voice processing unit 205 executes various types of sound processing under the control of the CPU 201. The image processing unit 206 executes various types of graphics processing under the control of the CPU 201. The communication interface 207 is an interface that enables communication with a server or another game device. The peripheral interface 208 is an interface that enables communication with peripheral devices such as the operation input device 103, the card reading device 104, the banknote insertion device 105, and the ticket payout device 106.

Example of Game Content

Next, an example of the content of a game that can be played by a user using the game device 100 according to this embodiment will be described. The game is realized by having the game device 100 execute the game program under the control of the CPU 201.

First, the player starts the game by inserting the card owned thereby into the card reading device 104 of the game device 100 and/or inserting a coin into the banknote insertion device 105. Once the card or coin has been inserted, the card balance or an amount of credit corresponding to the coin can be owned in the game.

Next, the game device 100 displays a betting screen allowing the player to bet on the slot game on the display device 102. The game device 100 then starts the slot game in response to a bet placed by the player and a start instruction issued thereby (a game that can be played by inserting a coin or the like in this manner such that the player is charged will be referred to in the following description as a normal game). First, the game device 100 rotates a plurality of virtual reels (five reels, for example), and stops rotating each of the reels at a random timing. After the reels are stopped, the display device 102 displays a part of each reel.

Figure 3:
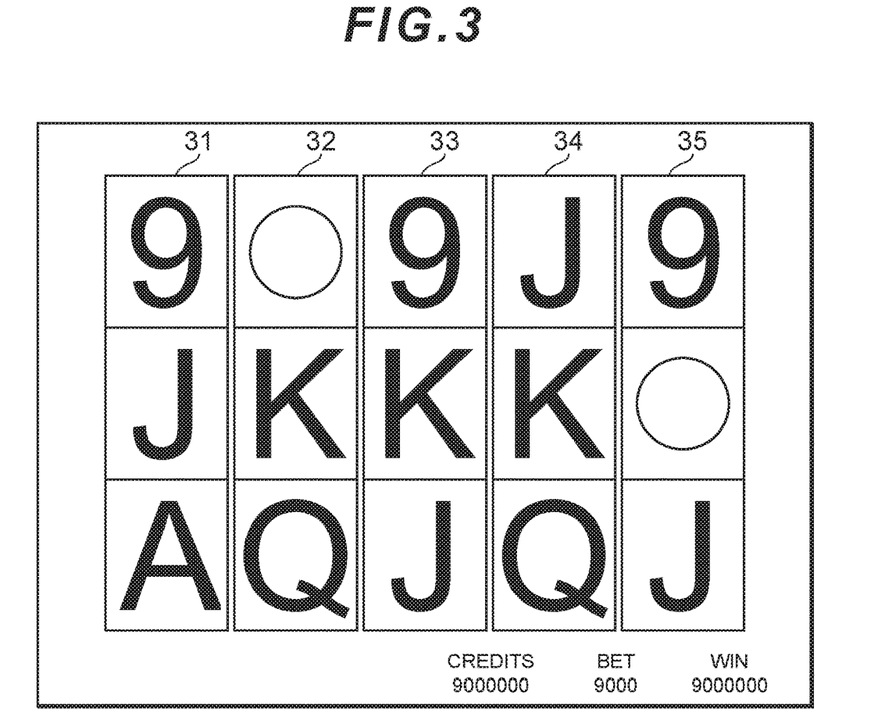
FIG. 3 is a conceptual diagram showing an example of a screen displayed on a display device according to this embodiment.

FIG. 3 shows an example of the parts of the respective reels displayed on the display device 102 after rotation of the reels has been stopped. In this example, reels 31 to 35 are displayed, and three symbols (pictures) are displayed on each reel. The player is granted various awards depending on whether or not the symbols displayed in this manner are arranged along a line (a pay line) set (or selected) in advance. Examples of the awards include credit and a free game. Further, awards of various values, from a big win to a small win, are set in accordance with the arrangement of the symbols. For example, the size of the win may be set to increase, and a correspondingly higher amount of credit may be awarded, as the probability of an arrangement of uniform symbols appearing along the pay line decreases. A free game will be described further below.

A free game is a slot game that can be played at no cost. When a predetermined symbol is arranged uniformly along the pay line (when three uniform symbols are arranged horizontally, for example) after rotation of the reels is stopped during a normal game, the game device 100 shifts to a state in which a free game can be played, whereby the player can play a predetermined number of free games (ten, for example) consecutively. Likewise during the free game, the player is granted various awards, such as credit and a retrigger, depending on the arrangement of the symbols after rotation of the reels is stopped. Here, a retrigger is an award allowing the player to play a further predetermined number of free games (ten, for example). A method of granting awards during a free game will be described in detail below.

When all of the free games have been played, the game device 100 shifts back to a state in which the normal game can be played.

Example of Functional Configuration of Game Device

Next, an example of a functional configuration of the game device 100 according to this embodiment will be described.

Figure 4:
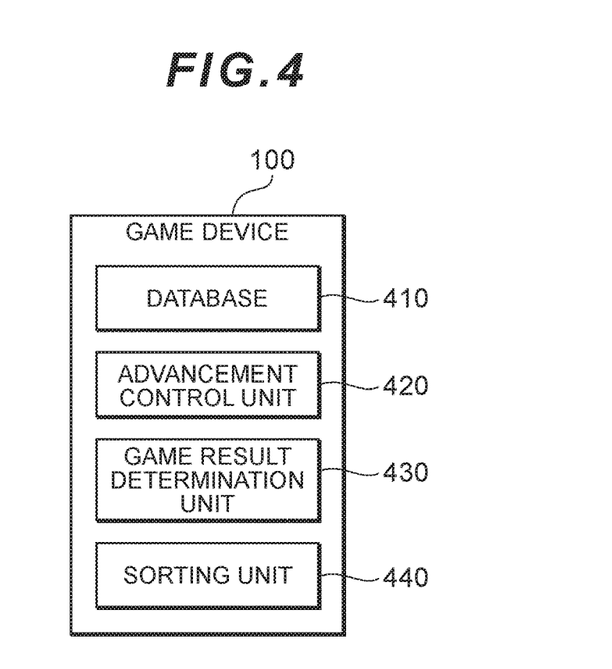
FIG. 4 is a block diagram showing a main functional configuration of the game device according to this embodiment.

FIG. 4 is a functional block diagram illustrating the functional configuration of the game device 100 according to this embodiment in blocks. As shown in the figure, the game device 100 mainly comprises, as functional configurations, a database 410, an advancement control unit 420, a game result determination unit 430, and a sorting unit 440. These functional configurations are realized by, for example, having the CPU 201 expand and execute the game program stored in the storage device 204 in the main memory 202.

The database 410 stores various types of information, such as information required for processing executed in the game device 100 and information generated by the processing. For example, the database 410 stores a control program for controlling the advancement of the game, image (static image, moving image, video, and so on, for example) data and sound data used to represent or dramatize the game, data relating to the state of a game currently underway, and so on.

The advancement control unit 420 executes processing to control the advancement of the game in accordance with operations implemented by the player of the game on the game device 100 and the control program stored in the database 410. More specifically, the advancement control unit 420 executes control to advance a normal slot game, as described above, control to switch from the normal game to a free game, control to advance the free game, and control to switch from the free game to a normal game. For example, when a predetermined symbol is displayed uniformly (when three uniform symbols are arranged horizontally, for example) after rotation of the reels is stopped during a normal game, the advancement control unit 420 executes control to switch to a state in which a free game can be played. The advancement control unit 420 then implements control to execute a predetermined number of free games (ten, for example) consecutively. Further, the control to advance the free game by the advancement control unit 420 is executed in accordance with processing results obtained by the game result determination unit 430 and the sorting unit 440, to be described below.

After a switch to the state in which a free game can be played, and before the free game is started, the game result determination unit 430 determines a game result with respect to each of the predetermined number of free games to be executed consecutively. In other words, when ten free games are to be executed consecutively, for example, the game result determination unit 430 determines the game results of all ten of the free games before the start of the first free game. To determine the game results, first, the game result determination unit 430 generates random data (a random number may be used), and in accordance with the random data (i.e. randomly), determines positions in which rotation of the plurality of virtual reels is to be stopped. The game result determination unit 430 determines the game results and the awards corresponding to the game results on the basis of whether or not the symbols on the reels displayed on the display device 102 in accordance with the determined stopping positions are arranged uniformly along the pay line.

Hence, in this embodiment, a game result is determined with respect to each of a predetermined number of free games to be executed consecutively before the free games are started. In contrast, when games are executed consecutively in a conventional game device used to play a slot game, the game result is determined before the start of each game. In this respect, therefore, the timing at which the game result of a free slot game according to this embodiment is determined differs from that of a conventional method.

Figure 5:
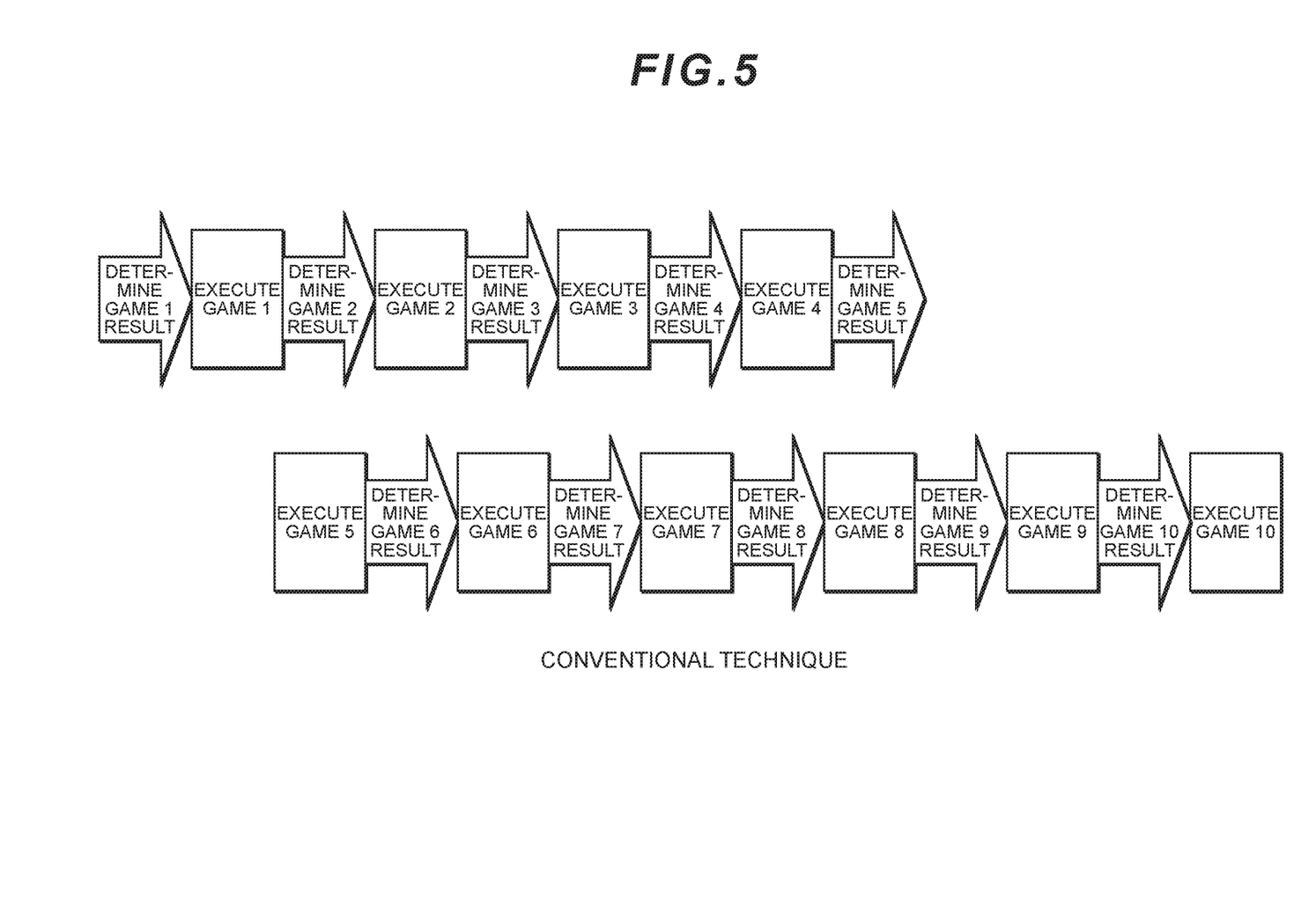
FIG. 5 is a conceptual diagram illustrating processing executed by a conventional game device.

FIG. 5 shows an example of timings for determining game results in a case where ten games are executed consecutively in a conventional game device used to play a slot game. The figure shows that the game result is determined before the start of each game.

Figure 6:
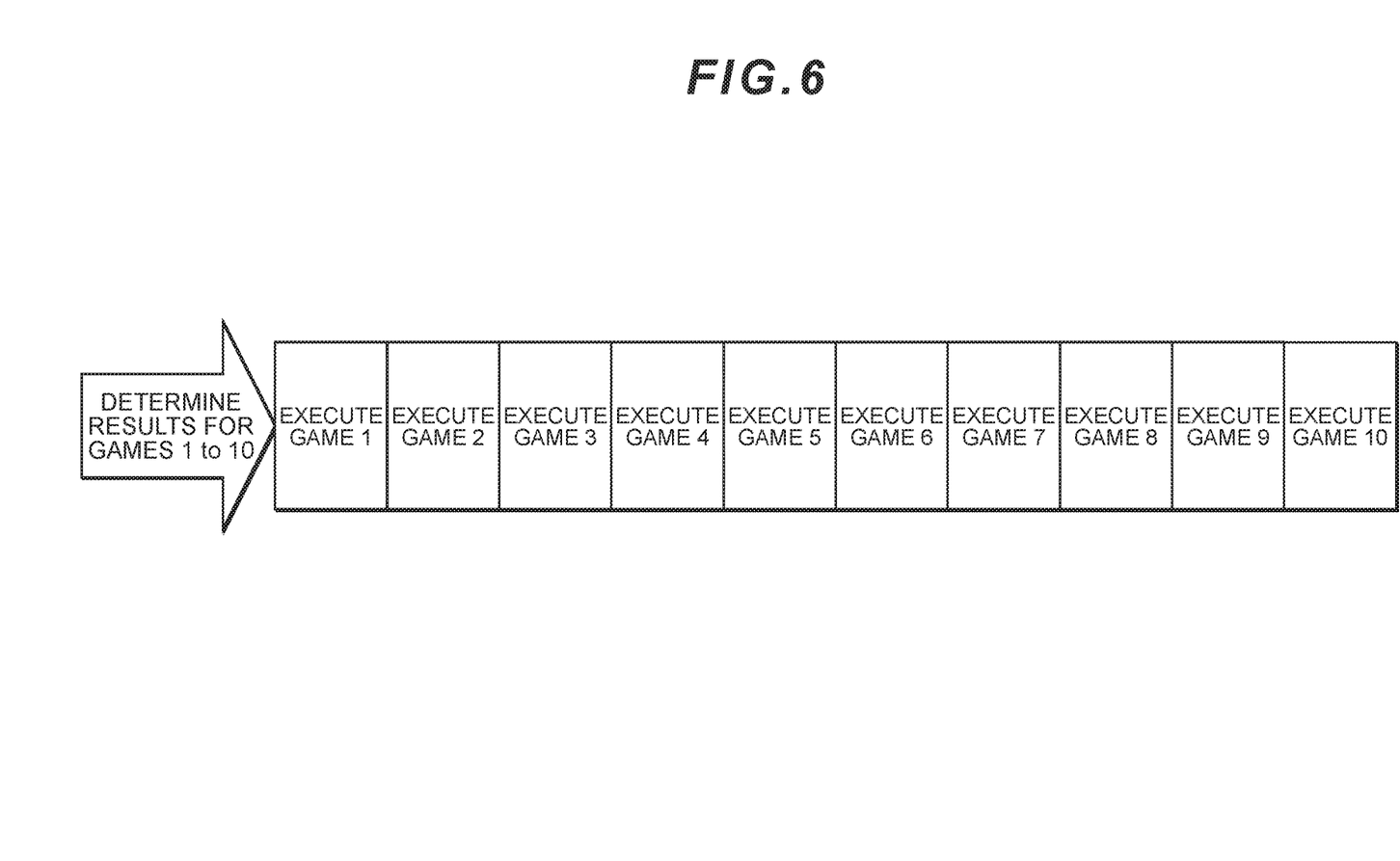
FIG. 6 is a conceptual diagram illustrating processing executed by the game device according to this embodiment.

FIG. 6 shows an example of a timing for determining game results in a case where ten games are executed consecutively in the game device 100 for playing a slot game according to this embodiment. The figure shows that all ten game results are determined before the start of the first game.

The sorting unit 440 sorts a starting sequence for the respective free games (in other words, rearranges the sequence in which the respective free games are to be started), on the basis of the results of the free games determined by the game result determination unit 430 (or a payout amount corresponding to the game result). For example, the sorting unit 440 sorts the starting sequence such that a free game with a more favorable game result (in other words, a bigger win, a granted award with a higher value, or a larger payout amount corresponding to the game result) comes later in the starting sequence. Next, the advancement control unit 420 starts to execute the free games in the sequence sorted by the sorting unit 440. In other words, at this time, the advancement control unit 420 functions as a free game starting unit. Here, executing a free game comprises processing in which the advancement control unit 420 rotates the plurality of virtual reels (five reels, for example), stops the rotation of each reel at the timing determined for each reel by the game result determination unit 430, and reproduces a video displaying the symbols on the stopped reels on the display device 102.

As a specific sorting method employed by the sorting unit 440, the sorting unit 440 may, for example, sort the sequence in which the respective free games are to be started, on the basis of the results of the respective free games, determined by the game result determination unit 430 (in other words, with respect to the symbols on the reels displayed on the display device 102 after rotation of the reels is stopped) and on the basis of a number of symbols arranged consecutively along the pay line. Further, the sorting unit 440 may sort the sequence in which the respective free games are to be started, on the basis of the results of the respective free games, determined by the game result determination unit 430. More specifically, the sorting unit 440 may implement sorting such that a free game for which a larger total number of tickets is paid out comes later in the sequence, the number of paid out tickets being determined by the number of consecutively arranged symbols and/or a set count of symbols arranged consecutively along pay lines. Note that the set count of symbols arranged consecutively along pay lines is determined as follows, for example. When three symbols are arranged consecutively along a certain pay line and five symbols are arranged consecutively along another pay line, the set count is two.

Further, for example, when the award granted to the player in accordance with the game result is a retrigger (an award allowing a further predetermined number of free games to be played), the corresponding game may be sorted so as to come last in the starting sequence.

Figure 7:
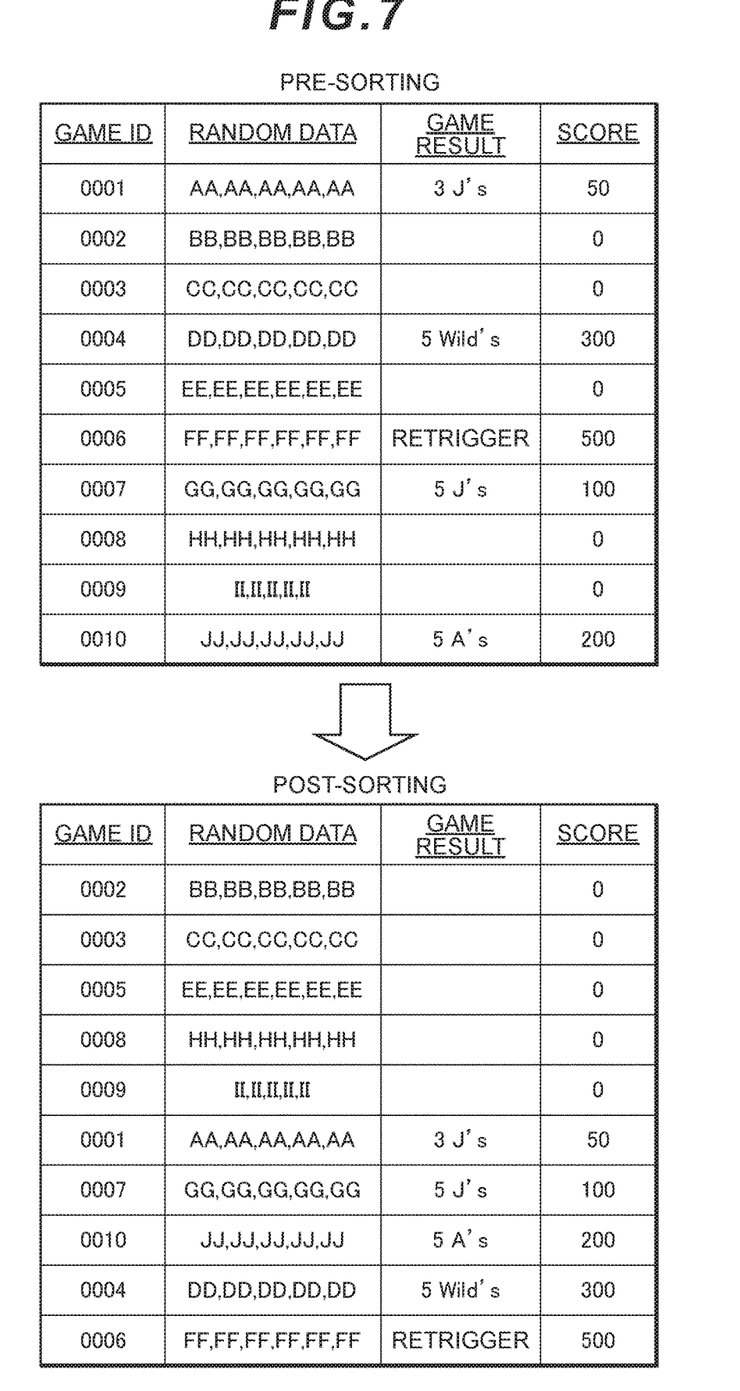
FIG. 7 is a conceptual diagram illustrating the processing executed by the game device according to this embodiment.

Referring to FIG. 7, an example of processing for sorting a starting sequence of ten free games will be described. For each free game, a game ID, random data, the game result, and a score are displayed on a pre-sorting table. The game ID is an identifier of each free game. The random data are data constituting the random data generated by the game result determination unit 430. The game result is a game result determined on the basis of the random data. For example, a result indicating that three "J" symbols are arranged along the pay line is displayed as the game result of the game having the game ID 1. Games for which no game result is displayed on the table are games in which a win is not obtained (losing games). The score is set to take a steadily higher value as the size of the win corresponding to the game result or the value of the granted award increases.

A post-sorting table displays a list of the games displayed on the pre-sorting table after being sorted by the sorting unit 440 into ascending order of the score. The advancement control unit 420 implements control to execute the games displayed on the post-sorting table in order from the top of the list.

According to this embodiment, as described above, a predetermined number of free games are executed in a sequence sorted on the basis of the results thereof. By sorting the games such that a game in which the size of the win corresponding to the game result or the value of the granted award is large comes later in the starting sequence, the player playing the free games obtains steadily better game results and awards as play advances. As a result, the player receives better results in games played later than in games played earlier, and therefore feels steadily more excited. Hence, it is possible to realize a more enjoyable game. Moreover, enjoyment of the game can be improved simply by modifying the starting sequence of the games, without varying a winning probability of each game.

Note that any method based on the results of the respective free games, as determined by the game result determination unit 430, may be used as the game sorting method employed by the sorting unit 440. For example, when two game results having awards of identical values exist, the sorting unit 440 may sort the game results so that the game having a more visually striking game result comes later in the sequence (for example, so that a game having a result in which one set of five symbols are aligned comes later than a game having a result in which two sets of three symbols are aligned). Further, the sorting unit 440 may sort the games such that a game in which the size of the win corresponding to the game result or the value of the granted award is large comes earlier in the starting sequence.

Processing Flow

Figure 8:
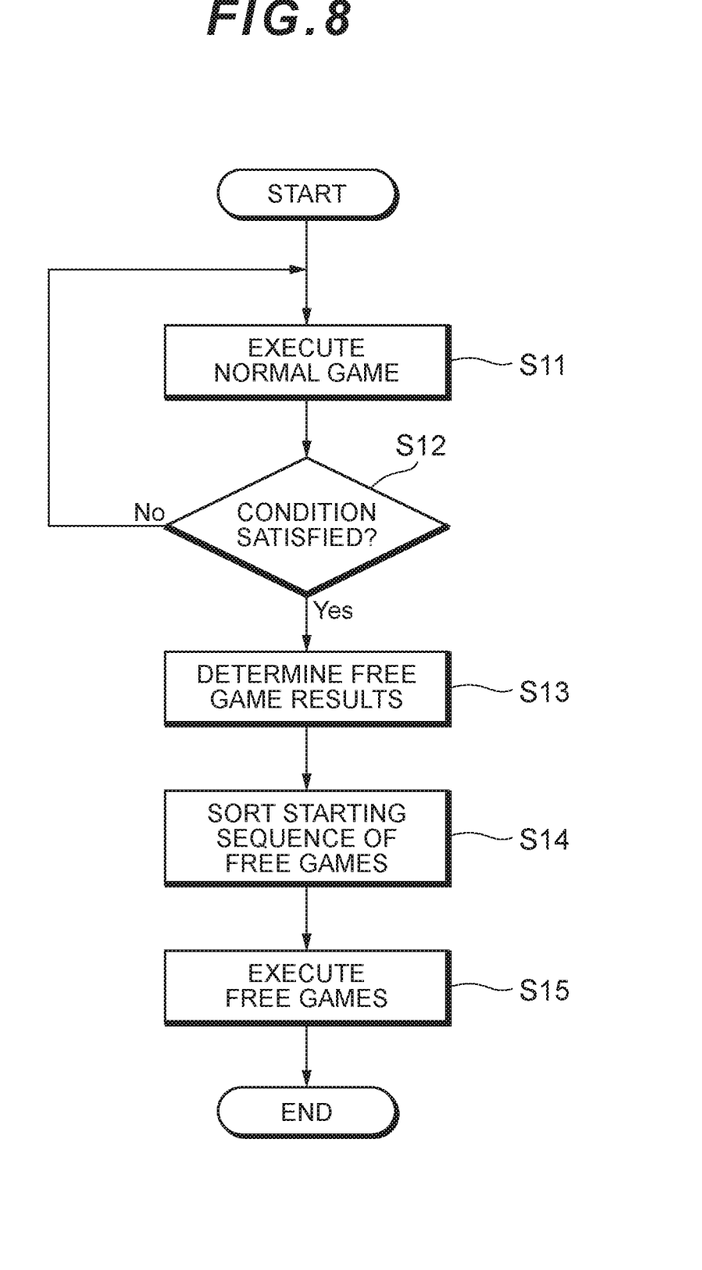
FIG. 8 is a flowchart illustrating the processing executed by the game device according to this embodiment.

Next, referring to FIG. 8, a flow of the processing executed by the game device 100 will be described. This processing is executed by having the CPU 201 function as a control unit that expands and executes a program stored in the storage device 204 or the like in the main memory 202, and so on. Note that the order of the respective processing steps included in the processing flow described below may be modified as desired, or the processing steps may be executed in parallel, as long as no inconsistencies occur in the processing content. Also, other steps may be added between the processing steps. Moreover, a step described for convenience as a single step may be executed after being divided into a plurality of steps, while steps described for convenience as a plurality of steps may be considered as a single step. Also note that the processing involved in the respective processing steps has already been described in detail, and therefore detailed description thereof has been omitted here.

First, in step S11, the CPU 201 starts to execute a normal game when a player inserts a payment for the game and issues an operation instruction on the game device 100, and then advances the game. More specifically, the CPU 201 executes control to display a video showing the plurality of virtual reels (five reels, for example) being rotated and the rotation of each reel stopping at a random timing on the display device 102. After rotation is stopped, the CPU 201 grants an award to the player in accordance with the arrangement of the symbols on the reels displayed on the display device 102.

In step S12, the CPU 201 determines whether or not the arrangement of the symbols on the reels displayed on the display device 102 satisfies a free game starting condition. For example, when a predetermined symbol is displayed uniformly along the pay line (when three identical symbols are arranged horizontally, for example), the CPU 201 determines that the starting condition is satisfied. When it is determined that the starting condition is satisfied, the processing advances to step S13, and in all other cases, the processing advances to step S11.

In step S13, the CPU 201 determines game results for the predetermined number of free games to be executed consecutively before the free games begin. In other words, assuming that ten free games are to be executed consecutively, the game result determination unit 430 determines the game results of all ten of the free games before the first free game is started.

In step S14, the CPU 201 sorts the starting sequence of the free games on the basis of the results of the free games, as determined in step S13. For example, the CPU 201 may implement sorting so that a game with a more favorable result (in other words, a bigger win or a granted award with a higher value) comes later in the starting sequence of the free games.

In step S15, the CPU 201 starts the free games in the sequence sorted in step S14. When all of the free games are complete, the processing shown in FIG. 8 is terminated.

According to this embodiment, as described above, a predetermined number of free games are executed in a sequence sorted on the basis of the results thereof. By sorting the games such that a game in which the size of the win corresponding to the game result or the value of the granted award is large comes later in the starting sequence, the player playing the free games obtains steadily better game results and awards as play advances. As a result, the player receives better results in games played later than in games played earlier, and therefore feels steadily more excited. Hence, it is possible to realize a more enjoyable game. Moreover, enjoyment of the game can be improved simply by modifying the starting sequence of the games, without varying the winning probability of each game.

Modified Example

The above embodiment was described envisaging a slot game, but the present disclosure is not limited thereto, and may be applied to any game in which free games that can be played at no cost can be played a plurality of times depending on the result of a normal game for which a payment has been paid.

INDUSTRIAL APPLICABILITY

As described above, the game device and so on according to the present disclosure is capable of making a game considerably more interesting, enjoyable, and fun than a conventional game machine and so on, thereby improving the sense of participation of a player in the game and the desire of the player to continue the game. As a result, the game device and so on according to the present disclosure can be employed widely and effectively in all areas of technology pertaining to software and hardware related to the provision, implementation, and so on of games, as well as activities relating to the design, manufacture, sale, and so on thereof.

LIST OF REFERENCE NUMERALS

100 Game device
101 Speaker
102 Display device
103 Operation input device
104 Card reading device
105 Banknote insertion device
106 Ticket payout device
201 CPU
202 Main memory
203 BIOS-ROM
204 Storage device
205 Voice processing unit
206 Image processing unit
207 Communication interface
208 Peripheral interface

What is claimed is:

1. A game device comprising:
a computer processor hardware configured to:
determine results of a plurality of games randomly;
sort, on the basis of the results, a sequence in which each of the plurality of games is to be started; and
start to display, one by one, each of videos showing operations of game items for each of the games in a starting sequence based on the sorted sequence, the display of the videos being the first display for the games,
wherein, when an award granted to a player in accordance with the result of the game is an award that allows the player to play a predetermined number of games at no cost, the computer processor hardware implements sorting so that the corresponding game comes last in the starting sequence.

2. The game device according to claim 1, wherein the computer processor hardware implements sorting so that a game having a more favorable result comes later in the starting sequence.

3. The game device according to claim 1, wherein the game is a slot game, and
the computer processor hardware implements sorting on the basis of a payout amount corresponding to the determined game result.

4. A game method implemented in a game device having computer processor hardware, the game method comprising:
causing the computer processor hardware to determine results of a plurality of games randomly;
causing the computer processor hardware to sort, on the basis of the results, a sequence in which the plurality of games are to be started; and
causing the computer processor hardware to start to display, one by one, each of videos showing operations of game items for each of the games in a starting sequence based on the sorted sequence, the display of the videos being the first display for the games,
wherein, when an award granted to a player in accordance with the result of the game is an award that allows the player to play a predetermined number of games at no cost, the computer processor hardware implements sorting so that the corresponding game comes last in the starting sequence.

5. A game device comprising: computer processor hardware and computer memory, wherein:
the computer processor hardware, by executing a program stored in the computer memory, carries out actions comprising:
determining results of a plurality of games randomly;
sorting, on the basis of the results, a sequence in which the plurality of games are to be started; and
starting to display, one by one, each of videos showing operations of game items for each of the games in a starting sequence based on the sorted sequence, the display of the videos being the first display for the games,
wherein, when an award granted to a player in accordance with the result of the game is an award that allows the player to play a predetermined number of games at no cost, the computer processor hardware implements sorting so that the corresponding game comes last in the starting sequence.

* * * * *